US009674397B2

(12) United States Patent
Itai

(10) Patent No.: US 9,674,397 B2
(45) Date of Patent: Jun. 6, 2017

(54) INFORMATION PROCESSING APPARATUS

(71) Applicant: Oki Data Corporation, Tokyo (JP)

(72) Inventor: Tomohiro Itai, Tokyo (JP)

(73) Assignee: Oki Data Corporation, Tokyo (JP)

( * ) Notice: Subject to any disclaimer, the term of this patent is extended or adjusted under 35 U.S.C. 154(b) by 0 days.

(21) Appl. No.: 15/049,608

(22) Filed: Feb. 22, 2016

(65) Prior Publication Data

US 2016/0269595 A1 Sep. 15, 2016

(30) Foreign Application Priority Data

Mar. 11, 2015 (JP) ................................. 2015-048173

(51) Int. Cl.
H04N 1/04 (2006.01)
H04N 1/40 (2006.01)
G06K 15/02 (2006.01)
H04N 1/387 (2006.01)

(52) U.S. Cl.
CPC ....... H04N 1/40093 (2013.01); G06K 15/024 (2013.01); G06K 15/1843 (2013.01); H04N 1/387 (2013.01); H04N 2201/0094 (2013.01)

(58) Field of Classification Search
CPC .............. H04N 1/387; H04N 1/40093; H04N 2201/0094
USPC ................... 358/1.2, 1.1, 1.9, 1.15
See application file for complete search history.

(56) References Cited

U.S. PATENT DOCUMENTS

| | | | | |
|---|---|---|---|---|
| 6,903,760 B2* | 6/2005 | McFarland | .......... | G11B 7/0037 347/225 |
| 2008/0170264 A1* | 7/2008 | Nino | ................... | H04N 1/00238 358/1.17 |
| 2008/0291497 A1* | 11/2008 | Kuwano | ............... | G06F 3/1208 358/1.18 |
| 2009/0244554 A1* | 10/2009 | Yamanouchi | ......... | G06F 3/1208 358/1.2 |
| 2011/0228286 A1* | 9/2011 | Kaima | ................. | G06K 15/128 358/1.2 |
| 2012/0147407 A1* | 6/2012 | Suzuki | ..................... | B41J 19/20 358/1.13 |
| 2015/0002910 A1* | 1/2015 | Miyazaki | ............... | H04N 1/024 358/451 |

FOREIGN PATENT DOCUMENTS

JP 2006-252369 A 9/2006

* cited by examiner

*Primary Examiner* — Houshang Safaipour
(74) *Attorney, Agent, or Firm* — Muncy, Geissler, Olds & Lowe, P.C.

(57) ABSTRACT

An information processing apparatus includes a receiving unit, a first memory unit, an extending unit, a second memory unit, a determining unit, and a correcting unit. The receiving unit receives image data. The first memory unit stores the image data. The extending unit extends the image data. The second memory unit stores the image data which is extended by the extending unit as an extended image data. The extended image data includes an object. The determining unit determines whether the object is arranged outside a print region of the image data. The correcting unit corrects the extended image data if the determining unit determines that the object is arranged outside the print region of the image data.

13 Claims, 17 Drawing Sheets

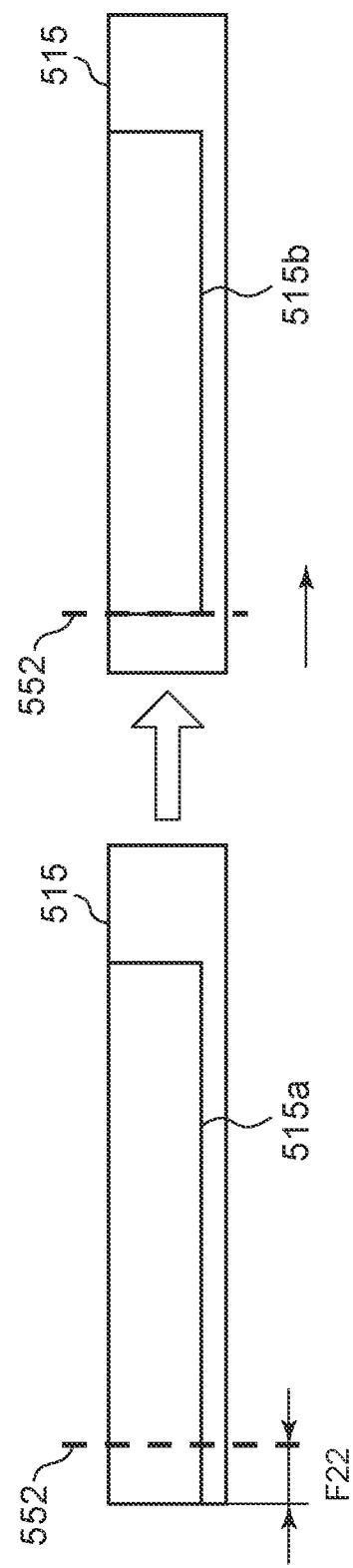

INFORMATION PROCESSING APPARATUS

CROSS REFERENCE TO RELATED APPLICATIONS

This application claims priority under 35 USC 119 to Japanese Patent Application No. 2015-048173 filed on Mar. 11, 2015, the entire contents which are incorporated herein by reference.

BACKGROUND OF THE INVENTION

1. Field of the Invention

This application relates to an information processing apparatus.

2. Description of Related Art

A conventional image forming apparatus executes flameless printing by extending the image data (see, for example, Japanese Laid-open Patent Publication No. 2006-252369).

However, because the image is extended, the image may be formed outside a wished print region.

SUMMARY OF THE INVENTION

According to an aspect of the disclosed embodiment, an information processing apparatus includes a receiving unit, a first memory unit, an extending unit, a second memory unit, a determining unit, and a correcting unit. The receiving unit receives image data. The first memory unit stores the image data. The extending unit extends the image data. The second memory unit stores the image data which is extended by the extending unit as an extended image data. The extended image data includes an object. The determining unit determines whether the object is arranged outside a print region of the image data. The correcting unit corrects the extended image data if the determining unit determines that the object is arranged outside the print region of the image data.

According to this embodiment, the information processing apparatus prevents the image to be formed outside a desired print region.

BRIEF DESCRIPTION OF THE DRAWINGS

In the attached drawings:

FIG. 22 is a schematic view showing the movement of the reduced character information block.

DETAILED DESCRIPTION OF EMBODIMENTS

Hereinafter, preferred embodiments of the invention will be described with reference to the attached drawings.

1. First Embodiment 1-1. Structure

Figure 1:
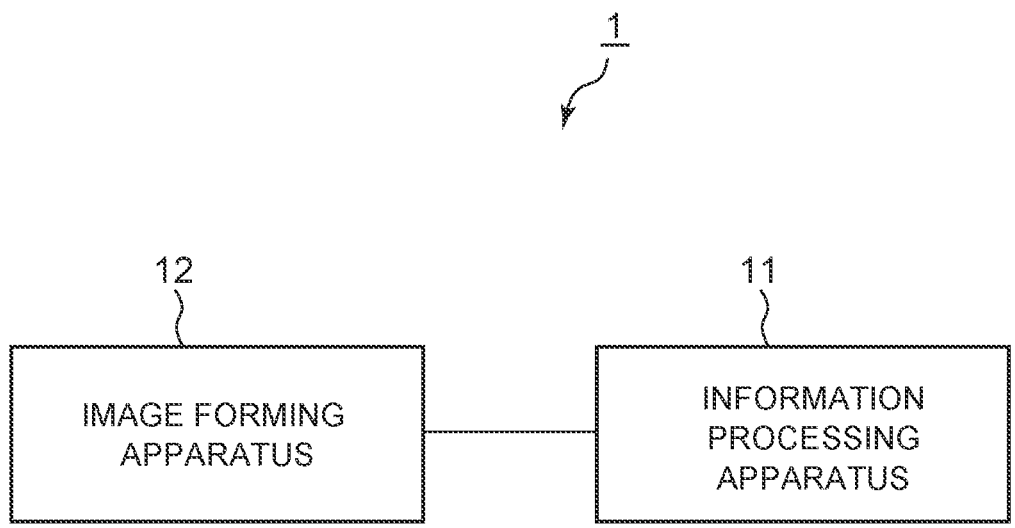
FIG. 1 is a block diagram showing a configuration of an image forming system.

FIG. 1 is a block diagram showing a configuration of an image forming system 1.

As shown in FIG. 1, the image forming system 1 may include an information processing apparatus 11 and an image forming apparatus 12. The information processing apparatus 11 is connected to the image forming apparatus 12 by wire system or radio system. The image forming apparatus 12 receives printing data from the information processing apparatus 11. The image forming apparatus 12 forms an image on a sheet based on the printing data.

Figure 2:
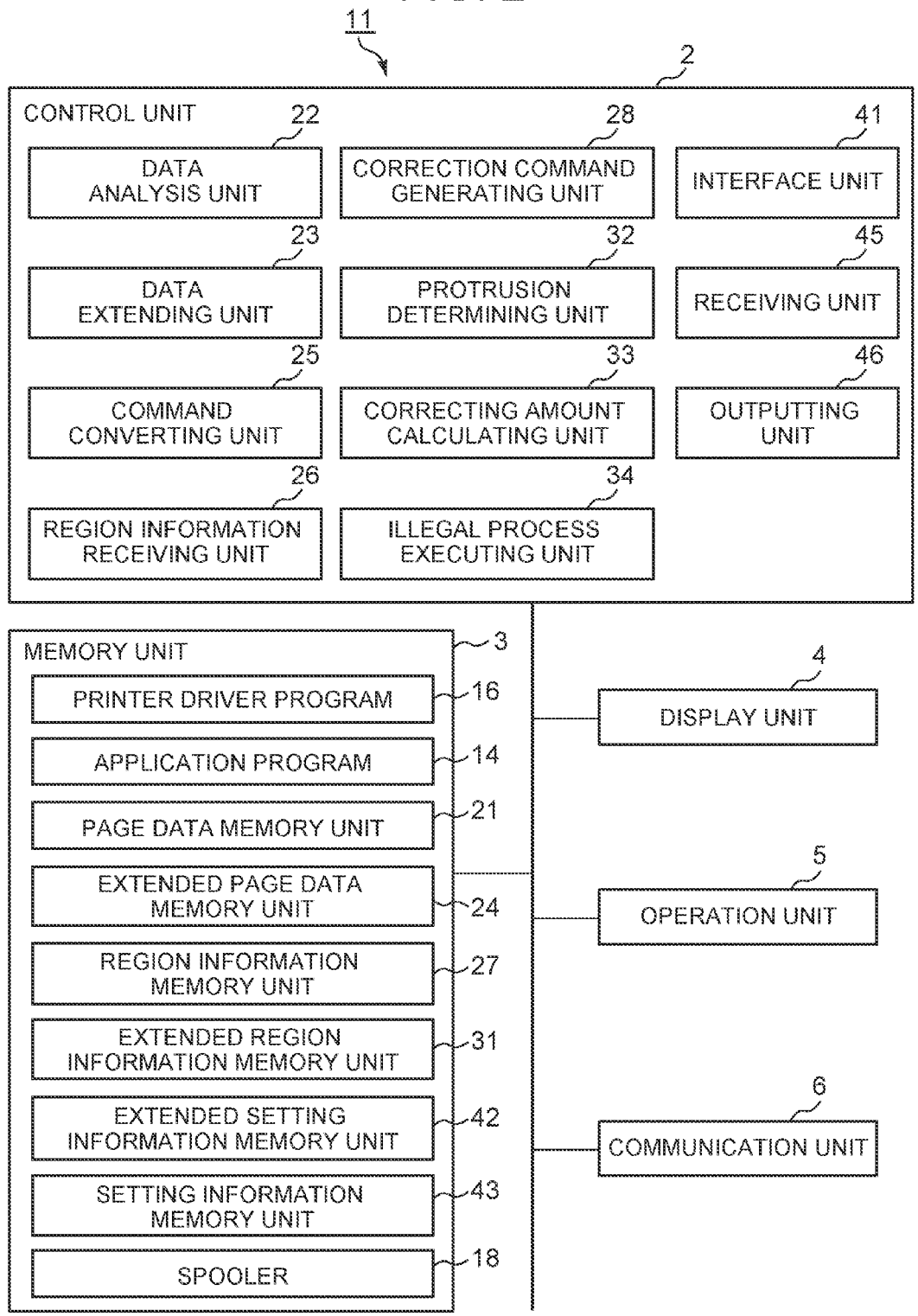
FIG. 2 is a block diagram showing a configuration of the information processing apparatus.

FIG. 2 is a block diagram showing a configuration of the information processing apparatus 11. The information processing apparatus 11 may include a control unit 2, a memory unit 3, a display unit 4, an operation unit 5 and a communication unit 6.

The communication unit 6 transmits data to the image forming apparatus 12. The communication unit 6 receives data from the image forming apparatus 12. For example, the communication unit 6 transmits the printing data to the image forming apparatus 12.

The operation unit 5 receives an input signal based on a user input. The operation unit 5 may be a keyboard.

The display unit 4 displays various information for a user. The display unit 4 may be a LCD (Liquid Crystal Display).

The memory unit 3 may be a HDD (Hard Disk Drive) or a flash memory. The memory unit 3 may be a part of a RAM (Random Access Memory). The memory unit 3 may include a printer driver program 16, an application program 14, a page data memory unit 21, an extended page data memory unit 24, a region information memory unit 27, an extended region information memory unit 31, an extended setting information memory unit 42, a setting information memory unit 43, and a spooler 18.

The control unit 2 may include a CPU (Central Processing Unit) and the RAM.

The control unit 2 read a program from the memory unit 3. The control unit 105 writes the program in the RAM. The control unit 105 controls the entire image forming apparatus 110 based on the written program.

The control unit 2 generates image data of document by collaborating with the CPU and the application program 14 written in the RAM. The control unit 2 generates printing data based on the image data by collaborating with the CPU and the printer driver program 16 written in the RAM.

The control unit 2 may include a data analysis unit 22, a data extending unit 23, a command converting unit 25, a region information receiving unit 26, a correction command generating unit 28, a the protrusion determining unit 32, a correcting amount calculating unit 33, an illegal process executing unit 34, an interface unit 41, a receiving unit 45, and an outputting unit 46. Each unit is realized by the CPU and the printer driver program 16 written in the RAM.

The interface unit 41 sets print setting information based on the user input to the operation unit 5. The print setting information may include one or more normal setting items and one or more extended setting items. The normal setting item may be color/monochrome print setting or one side/duplex print setting. The extended setting item may be flame-less print setting. The setting information memory unit 43 stores the normal setting items. The extended setting information memory unit 42 stores the extended setting items.

Figure 3:
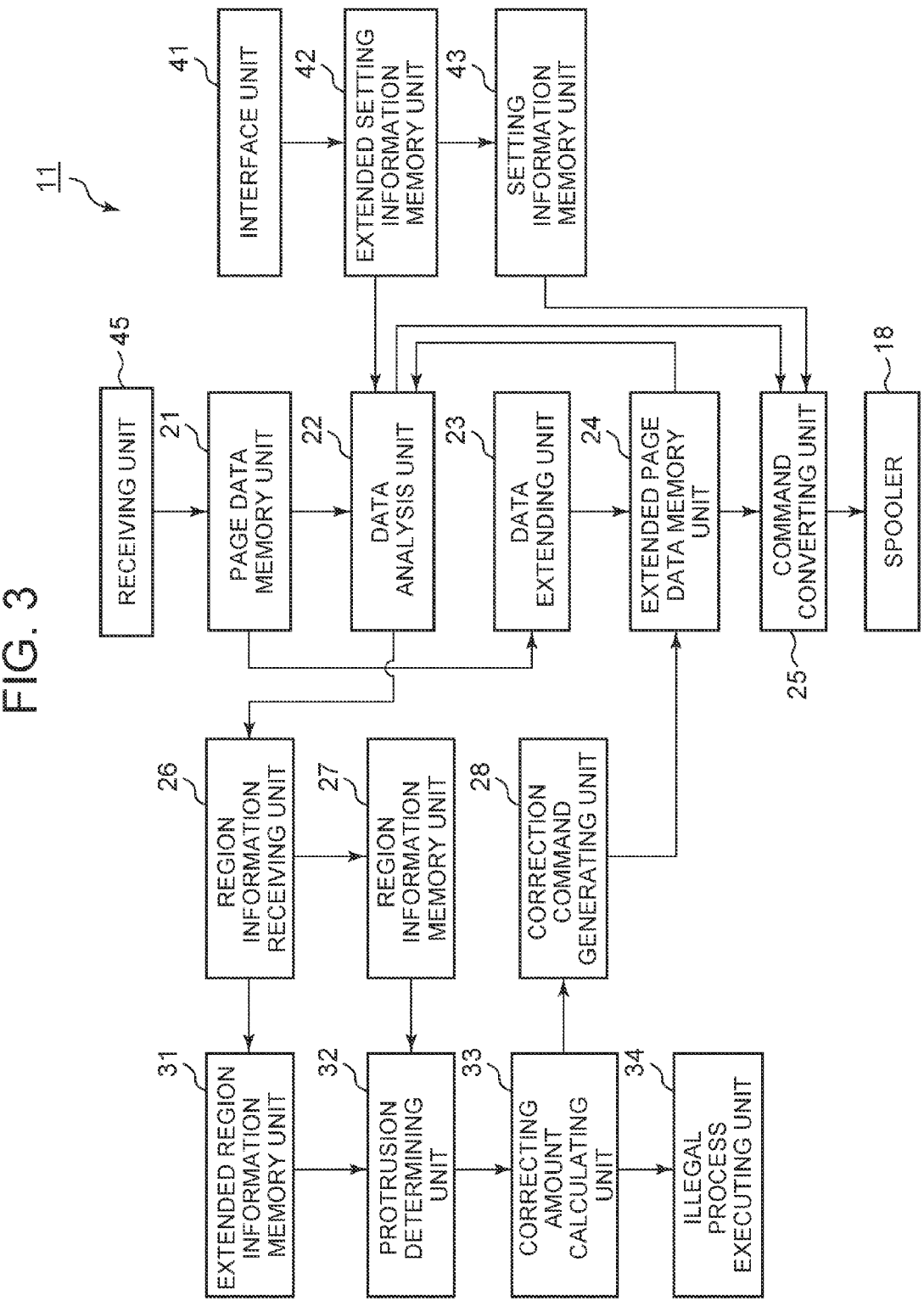
FIG. 3 is a block diagram showing a function configuration of the information processing apparatus according to the first embodiment.

FIG. 3 is a block diagram showing a function configuration of the information processing apparatus 11.

The receiving unit 45 receives image data generated by the application program 14. For example, the application program 14 generates image data including page data sets for a plurality of pages included a document. The receiving unit 45 receives a part of the image data corresponding to first page (a first page data set). The receiving unit 45 writes the first page data set to the page data memory unit 21. The data analysis unit 22 receives the first page data set stored in the page data memory unit 21. The data analysis unit 22 refers to a value of the extended setting item stored in the extended setting information memory unit 42. If the value of the extended setting item is "executing flame-less printing", the data analysis unit 22 outputs the first page data set stored in the page data memory unit 21 to the data extending unit 23. On the other hand, if the value of the extended setting item is "not executing flame-less printing", the data analysis unit 22 does not output the first page data set to the data extending unit 23.

If the value of the extended setting item is "not executing flame-less printing", the data analysis unit 22 generates first analysis result information based on the first page data set stored in the page data memory unit 21. The data analysis unit 22 outputs the first analysis result information to the command converting unit 25.

If the value of the extended setting item is "executing flame-less printing", the data analysis unit 22 generates first analysis result information based on the first page data set stored in the page data memory unit 21. Furthermore, the data analysis unit 22 refers to a value of the extended setting item stored in the extended setting information memory unit 42. The data analysis unit 22 generates second analysis result information based on a first extended page data set stored in the extended page data memory unit 24 and the value of the extended setting item. The data analysis unit 22 outputs the first analysis result information and the second analysis result information to the region information receiving unit 26.

The data extending unit 23 extends the first page data set outputted from the data analysis unit 22. Then the data extending unit 23 generates the first extended page data set. The data extending unit 23 writes the first extended page data set in the extended page data memory unit 24.

The correction command generating unit 28 incorporates a correction command into the first extended page data set in the extended page data memory unit 24. The correction command may include correction information. The command converting unit 25 read the first extended page data set that the correction command is incorporated into, from the extended page data memory unit 24.

The command converting unit 25 receives the first page data set stored in the page data memory unit 21, from the data analysis unit 22. The command converting unit 25 converts the first page data set into printing data based on the normal print setting item stored in the setting information memory unit 43. The command converting unit 25 outputs the printing data to the spooler 18.

Or the command converting unit 25 read the first extended page data set from he extended page data memory unit 24. The command converting unit 25 converts the first extended page data set into printing data based on the normal print setting item stored in the setting information memory unit 43. The command converting unit 25 outputs the printing data to the spooler 18. The printing data includes a print command.

The spooler 18 spools the printing data. The printing data spooled in the spooler 18 is received by the image forming apparatus 12.

The region information receiving unit 26 receives the first analysis result information and the second analysis result information from the data analysis unit 22. The region information receiving unit 26 writes region information in the region information memory unit 27 based on the first analysis result information. The region information includes size information of print region. For example, the size information is sheet size. If label print processing is executed, the size information is label size. The region information receiving unit 26 writes extended region information in the extended region information memory unit 31 based on the second analysis result information. The extended region information includes extended size information of extended print region, a printing start position of a character information block and a printing range of the character information block. The character information block is included in the first extended page data set. The character information block indicates one or more characters. The character information block is an object.

The protrusion determining unit 32 read the size information, namely, the sheet size or the label size from the region information memory unit 27. The protrusion determining unit 32 read the printing start positions and the printing ranges of the character information blocks (the objects) from the extended region information memory unit 31. The protrusion determining unit 32 determines whether the character information block is arranged outside the sheet size (or label size) based on the size information, the block start positions of the character information blocks and the block ranges of the character information blocks.

If the protrusion determining unit 32 determines that the character information block is arranged outside the sheet size, the correcting amount calculating unit 33 calculates protrusive amount based on the size information, the printing start position of the character information block and the printing range of the character information block. The correcting amount calculating unit 33 determines whether the protrusion can be eliminated if the first extended page data set is corrected based on the protrusive amount. If the protrusion can be eliminated, the correcting amount calculating unit 33 calculates movement amount for moving all the character information blocks included in the first executed page data set, in a specific direction by a constant distance. The correcting amount calculating unit 33 outputs the calculated movement amount as a correcting amount, to the correction command generating unit 28. If the protrusion is not eliminated, the correcting amount calculating unit 33 outputs information indicating that correction cannot be executed, to the illegal process executing unit 34.

The correction command generating unit 28 receives the correcting amount from the correcting amount calculating unit 33. The correction command generating unit 28 generates a correction command for correcting the first executed page data set based on the correcting amount. On the other hand, if the protrusion determining unit 32 determines that all of the character information blocks are not arranged outside the sheet size, the correction command generating unit 28 generates a correction command indicating that the correction is not executed.

The correction command generating unit 28 incorporates the generated correction command into the first extended page data set in the extended page data memory unit 24.

If the illegal process executing unit 34 receives the impossible information from the correcting amount calculating unit 33, the illegal process executing unit 34 executes an illegal processing. The illegal processing is explained below.

1-2. Processing

Next, processing of the image forming system 1 is explained.

Figure 4:
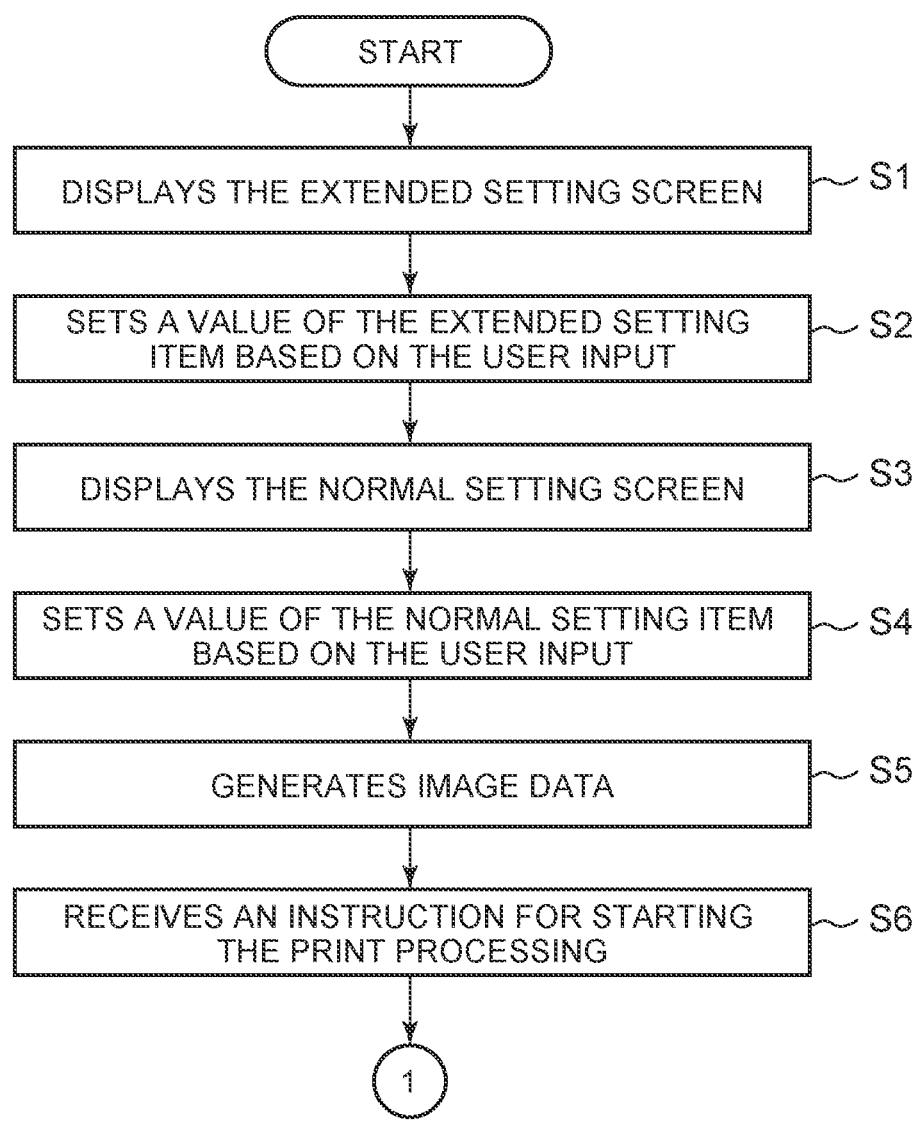
FIG. 4 is a flowchart showing processing executed by the information processing apparatus according to the first embodiment.
Figure 5:
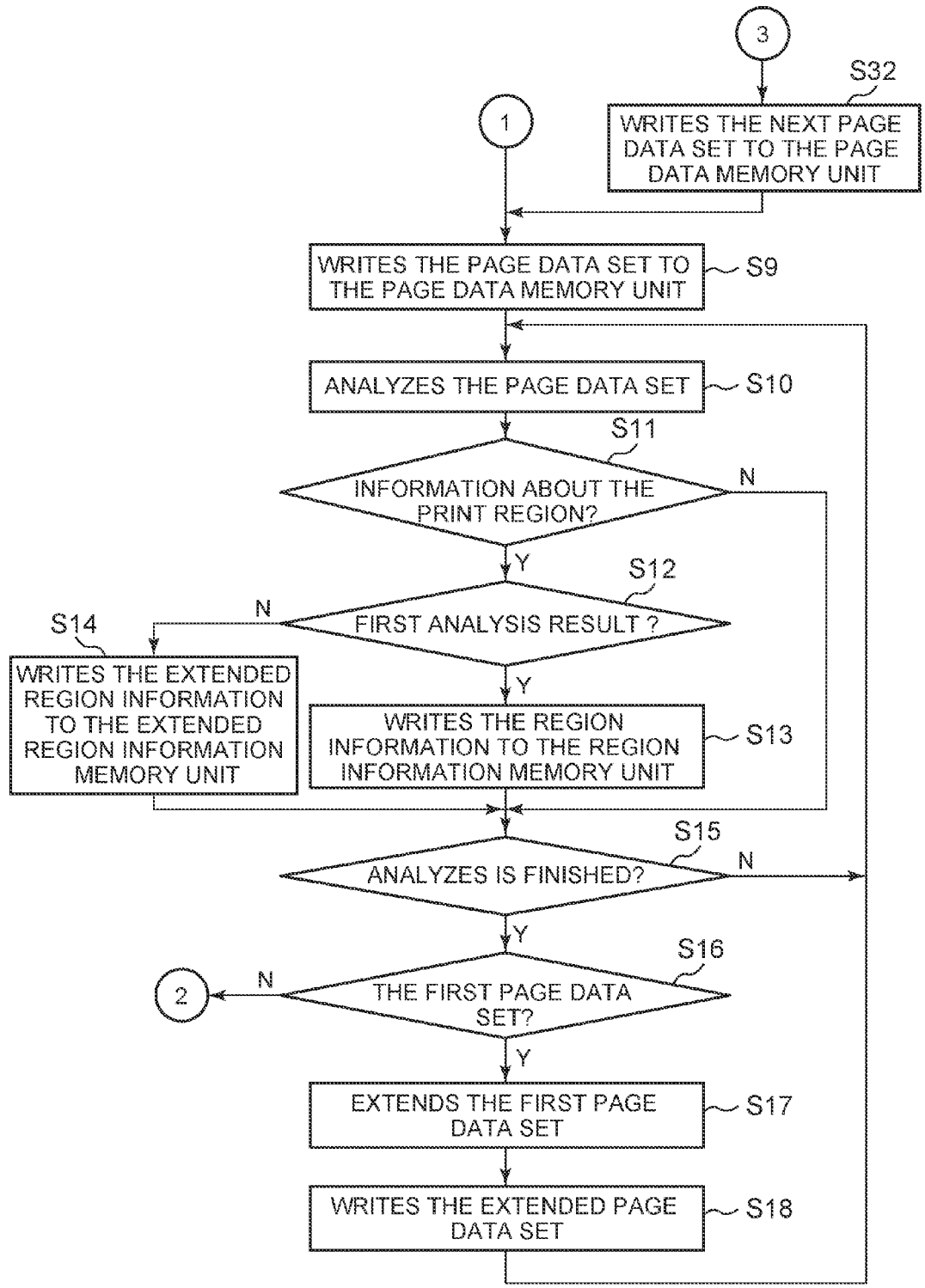
FIG. 5 is a flowchart showing processing executed by the information processing apparatus according to the first embodiment.
Figure 6:
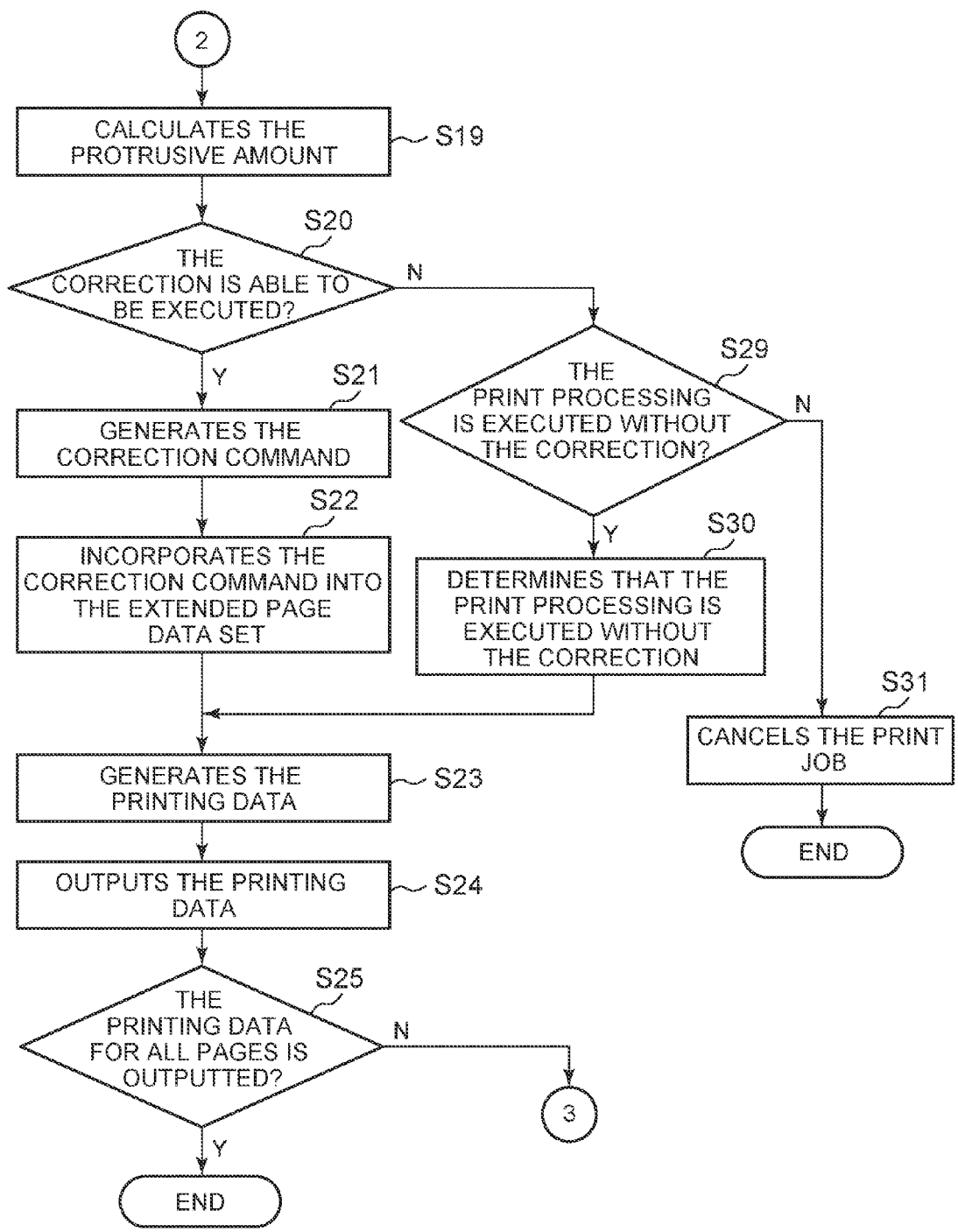
FIG. 6 is a flowchart showing processing executed by the information processing apparatus according to the first embodiment.

FIG. 4, FIG. 5, and FIG. 6 are flowcharts showing processing executed by the information processing apparatus 11.

Figure 7:
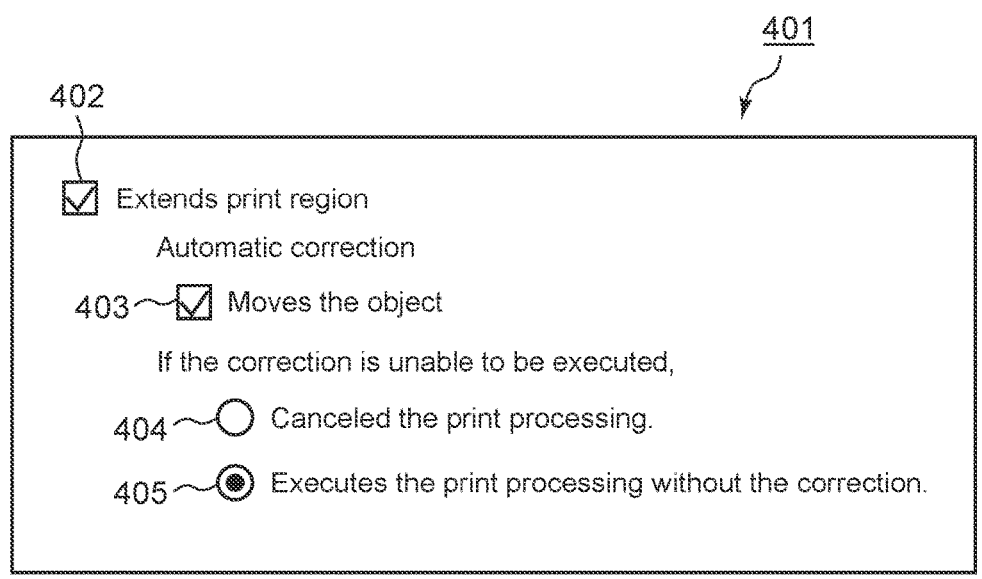
FIG. 7 is a schematic view showing an extended setting screen according to the first embodiment.

First, when the operation unit 5 receives the input signal based on the user input for displaying an extended setting screen 401 shown in FIG. 7, the interface unit 41 controls the display unit 4 to display the extended setting screen 401 (step S1).

Next, when the operation unit 5 receives the input signal based on the user input for setting the value of the extended setting item to the extended setting screen 401, the interface unit 41 sets the value of the extended setting item (step S2). Namely, the interface unit 41 writes the value of the extended setting item to the extended setting information memory unit 42.

As shown FIG. 7, the extended setting screen 401 may include a checkbox 402, a checkbox 403, a radio button 404, and a radio button 405. The checkbox 402 is for selecting whether the print region is extended. If the user desires that the print region is extended, the user switches on the checkbox 402. In FIG. 4, FIG. 5, and FIG. 6, the processing when the checkbox 402 is switched on is explained.

The checkbox 403 is for selecting whether a correction is executed when the character information block is arranged outside the sheet size. The correction is to move all of the character information blocks included in the first executed page data set, in a specific direction by a constant distance.

If the user desires that the correction is executed, the user switches on the checkbox 403.

Either the radio button 404 or the radio button 405 can be selected. The radio button 404 and the radio button 405 are for selecting which processing is executed if the correction is cannot be executed. If the radio button 404 is selected, the print processing is canceled. If the radio button 405 is selected, the print processing executes without the correction.

Next, when the operation unit 5 receives the input signal based on the user input for displaying a normal setting screen, the interface unit 41 controls the display unit 4 to display the normal setting screen (step S3).

Next, when the operation unit 5 receives the input signal based on the user input for setting the value of the normal setting item to the normal setting screen, the interface unit 41 sets the value of the normal setting item (step S4). Namely, the interface unit 41 writes the value of the normal setting item to the setting information memory unit 43.

Next, the application program 14 generates image data including page data sets for a plurality of pages (step S5). Specifically, the image data includes a first page data set corresponding to a first page of the document, a second page data set corresponding to a second page of the document, and a third page data set corresponding to a third page of the document.

Next, when the operation unit 5 receives the input signal based on the user input for executing the print processing, the interface unit 41 receives an instruction signal. Namely, the interface unit 41 receives an instruction for starting the print processing (step S6). Then the application program 14 outputs the image data to the receiving unit 45.

As shown FIG. 5, the receiving unit 45 receives the first page data set. The receiving unit 45 writes the first page data set to the page data memory unit 21 (step S9).

The data analysis unit 22 receives the first page data set from the page data memory unit 21. The data analysis unit 22 analyzes the first page data set (step S10). The data analysis unit 22 generates first analysis result information. The data analysis unit 22 generates second analysis result information based on the first extended page data set stored in the extended page data memory unit 24 and the value of the extended setting item stored in the extended setting information memory unit 42. The data analysis unit 22 outputs the first analysis result information and the second analysis result information to the region information receiving unit 26.

The region information receiving unit 26 receives the first analysis result information and the second analysis result information from the data analysis unit 22.

If the region information receiving unit 26 determines that the received information is information about the print region of the first analysis result information (step S11: YES, step S12: YES), the region information receiving unit 26 writes the region information to the region information memory unit 27 (step S13).

If the region information receiving unit 26 determines that the received information is information about the print region of the second analysis result information (step S11: YES, step S12: NO), the region information receiving unit 26 writes the extended region information to the extended region information memory unit 31 (step S14).

Next, the data analysis unit 22 determines whether an analysis for the first page data set and the first extended page data set is completed (step S15).

If the data analysis unit 22 determines that the analysis is not completed (step S15: NO), the process moves to step S10.

If the data analysis unit 22 determines that the analysis is completed (step S15: YES), the data extending unit 23 extends the first page data set (step S16: YES, step S17). Then the data extending unit 23 writes the first extended page data set to the extended page data memory unit 24 (step S18). On the other hand, for the first extended page data set, a processing for calculating a correcting amount is executed (step S16: NO, step S19).

Figure 8:
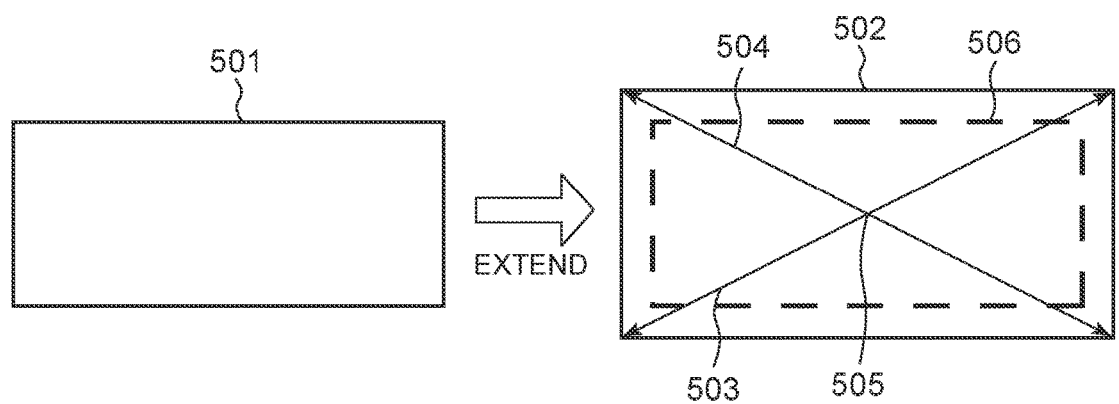
FIG. 8 is a schematic view showing an extended method for a first page data set.

FIG. 8 is a schematic view showing an extended method for a first page data set. As shown FIG. 8, the first page data set 501 is extended in a direction of a diagonal 503 and in a direction of a diagonal 504, around a point 505. The extended first page data set 501 is the first extended page data set 502. A sheet size 506 is equal with a size of the first page data set 501.

Figure 9:
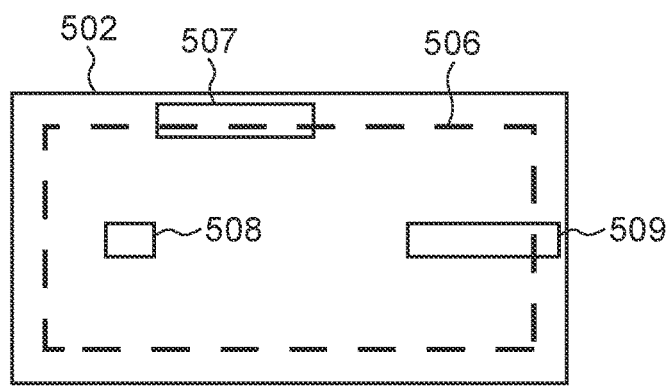
FIG. 9 is a schematic view showing a first extended page data set.

As shown FIG. 9, the protrusion determining unit 32 reads the size of the first page data set 501, namely the sheet size 506, from the region information memory unit 27. The protrusion determining unit 32 reads the first extended data set 502 from the extended region information memory unit 31. Then, the protrusion determining unit 32 determines whether at least a part of the character information block is arranged outside the sheet size. The extended page data set 502 includes a first character information block 507, a second character information block 508, and a third character information block 509.

If the protrusion determining unit 32 determines at least the part of the character information block is arranged outside the sheet size, the correcting account calculating unit 33 calculates the protrusive amount of the character information block (step S19). The correcting account calculating unit 33 determines whether the protrusion is eliminated if the first extended page data set is corrected, based on the protrusive amount and position information (a block start position and a block range) of the character information block (step S20). If the correcting amount calculating unit 33 determines that the protrusion is eliminated (step S20: YES), the correcting amount calculating unit 33 calculates movement amount for moving the all character information blocks included in the first executed page data set, in a specific direction by a constant distance so that the protrusion is eliminated, based on the protrusive account. The correcting amount calculating unit 33 outputs the calculated movement amount as the correcting amount, to the correction command generating unit 28. The correction command generating unit 28 generates the correction command for correcting the first executed page data set 502 based on the correcting amount (step S21). On the other hand, if the correcting amount calculating unit 33 determines that the protrusion is not eliminated (step S20: NO), the process moves to step S29.

Figure 10:
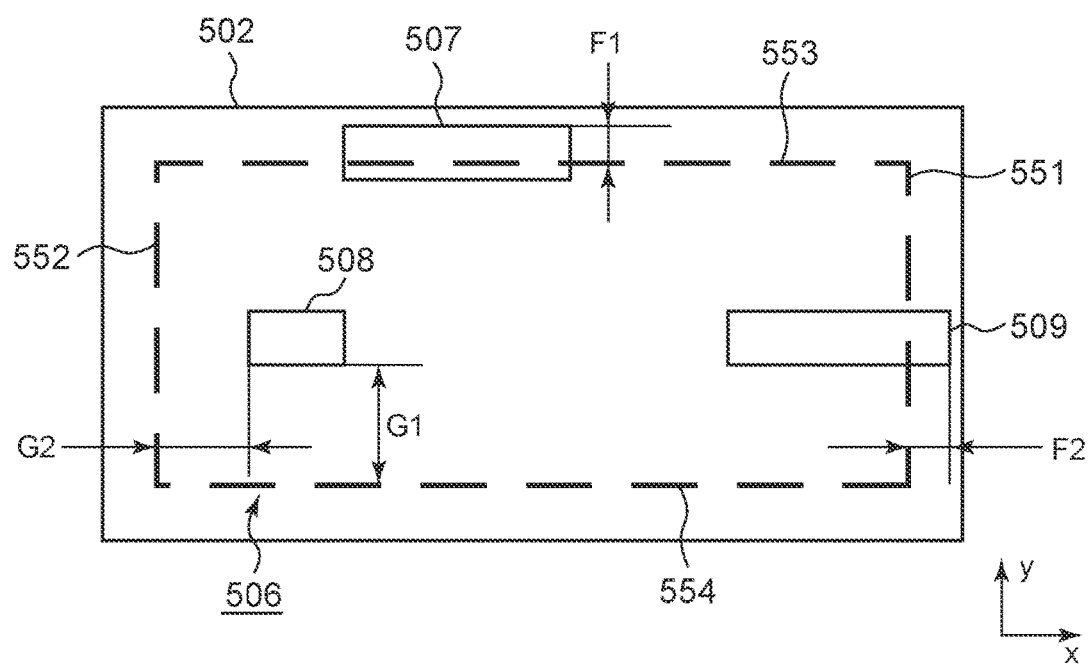
FIG. 10 is a schematic view showing a protrusive amount.
Figure 11:
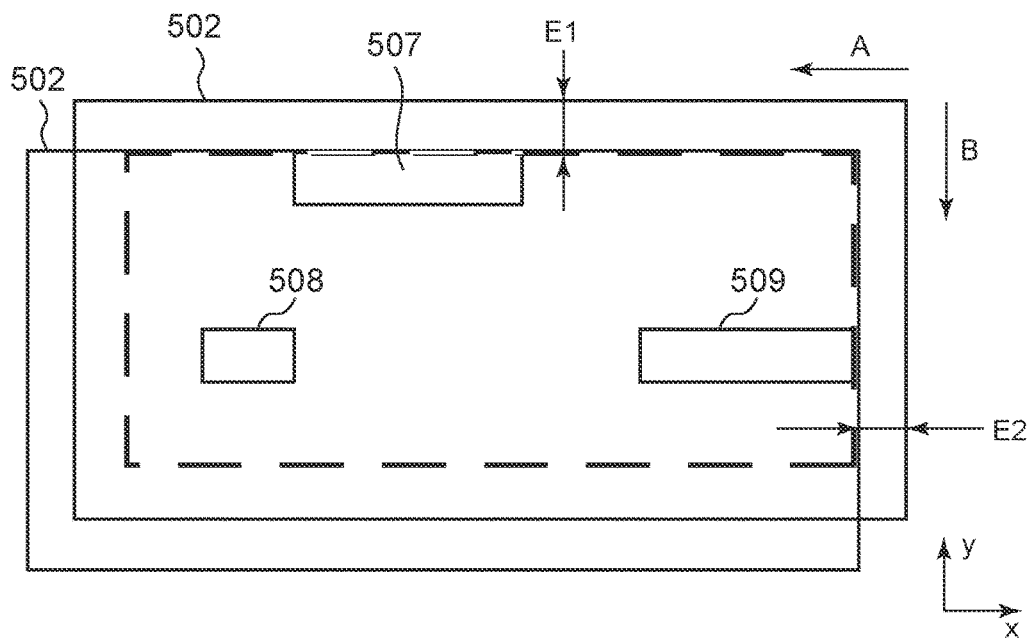
FIG. 11 is a schematic view showing movement of the first extended page data set.
Figure 12:
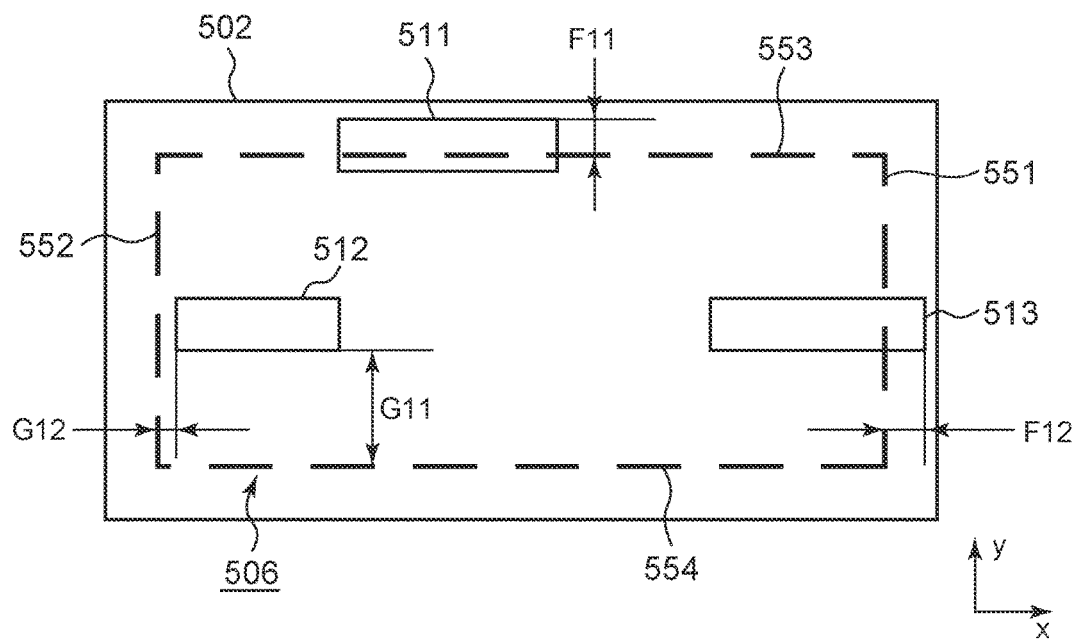
FIG. 12 is a schematic view showing movement of the first extended page data set and a protrusive amount.

As shown FIG. 10, FIG. 11, FIG. 12, a X-axis indicates a main scanning direction. A Y-axis indicates a sub-scanning direction. A border 551, a border 552, a border 553, and a border 554 are borders of the sheet size 506.

As for the first character information block 507, a protrusive amount F1 protrudes from the border 553 in the positive direction of the Y-axis. The second character information block 508 does not protrude from the sheet size 506. As for the third character information block 509, a protrusive amount F2 protrudes from the border 551 in the positive direction of the X-axis.

In this case, a distance G1 between the second character information block 508 and the border 554 is bigger than the protrusive amount F1. And a distance G2 between the second character information block 508 and the border 552 is bigger than the protrusive amount F2. Therefore, even if All of the character information block (the first character information block 507, the second character information block 508, the third character information block 509) is moved in a specific direction by a constant distance so that the protrusive amount F1 and the protrusive amount F2 become "0", the second character information block 508 does not protrude from the sheet size 506. Therefore, the correcting amount calculating unit 33 determines that the protrusion can be eliminated by correcting the first extending page data set 502.

The correcting amount calculating unit 33 calculates the movement amount about all of the character information blocks, namely, the movement amount of the first extending page data set 502. As shown FIG. 11, the correcting amount calculating unit 33 calculates the movement amount E1 of the first extended page data set 502 in the negative direction of the Y-axis, namely, in an arrow B direction.

$$F1 \leq E1 \leq G2$$

The correcting amount calculating unit 33 calculates the movement amount E2 of the first extended page data set 502 in the negative direction of the X-axis, namely, in an arrow A direction.

$$F2 \leq E2 \leq G2$$

The correcting amount calculating unit 33 outputs the movement amount E1 and the movement amount E2 as the correcting amount, to the correction command generating unit 28. The correction command generating unit 28 generates the correction command for executing a correction for the first executed page data set 502. The correction command generating unit 28 incorporates the generated correction command into the first extended page data set in the extended page data memory unit 24 (step S22).

The command converting unit 25 receives the first extended page data set 502 from the extended page data memory unit 24. The command converting unit 25 converts the first extended page data set 502 into printing data based on the normal print setting item stored in the setting information memory unit 43. Namely, the command converting unit 25 generates the printing data (step S23). The command converting unit 25 outputs the printing data to the spooler 18 (step S24).

Next, the command converting unit 25 determines whether the printing data corresponding to all pages of the document are outputted to the spooler 18 (step S25). If the printing data corresponding to all pages of the document are outputted to the spooler 18 (step S25: YES), the processing is finished. The image forming apparatus 12 receives the printing data stored in the spooler 18 appropriately. The image forming apparatus 12 forms an image on a sheet based on the printing data.

On the other hand, if the printing data corresponding to all pages of the document are not outputted to the spooler 18 (step S25: NO), the receiving unit 45 receives a part of the image data corresponding to the next page (step S32). The image data corresponding to the next page is the second page data set.

On the other hand, as shown in FIG. 12, the first extended page data set 502 includes a fourth character information block 511, a fifth character information block 512, a sixth character information block 513. As for the fourth character information block 511, a protrusive amount F11 protrudes from the border 553 in the positive direction of the Y-axis.

The fifth character information block 512 does not protrude from the sheet size 506. As for the sixth character information block 513, a protrusive amount F12 protrudes from the border 551 in the positive direction of the X-axis.

In this case, a distance G11 between the fifth character information block 512 and the border 554 is bigger than the protrusive amount F11. And a distance G12 between the fifth character information block 512 and the border 552 is smaller than the protrusive amount F12. Therefore if all of the character information block (the forth character information block 511, the fifth character information block 512, the sixth character information block 513) is moved in a specific direction by a constant distance so that the protrusive amount F11 and the protrusive amount F12 become "0", the fifth character information block 512 protrudes from the sheet size 506. Therefore, the correcting amount calculating unit 33 determines that the protrusion cannot be eliminated by correcting the first extending page data set 502 (step S20: NO).

Next, the correcting amount calculating unit 33 outputs impossible information indicated that the correction cannot be executed, to the illegal process executing unit 34. If the illegal process executing unit 34 receives the impossible information, the illegal process executing unit 34 receives the value of the extended setting item from the extended setting information memory unit 42. The illegal process executing unit 34 determines whether the print processing is executed without the correction based on the value of the extended setting item (step S29).

In the extended setting screen 401, if radio button 405 is selected, the illegal process executing unit 34 determines that print processing is executed without the correction based on the value of the extended setting item (step S29: YES, step S30). The correction command generating unit 28 generates the correction command indicating that the correction is not executed. The correction command generating unit 28 incorporates the correction command into the first extended page data set in the extended page data memory unit 24. Then the process moves the step S23.

On the other hand, if radio button 404 is selected, the illegal process executing unit 34 determines that print processing is canceled based on the value of the extended setting item (step S29: NO). The illegal process executing unit 34 cancels the print job for the image data (step S31). Then the processing is finished.

According to the first embodiment, it is prevented that the image is formed outside a wished print region.

2. Second Embodiment

Next, the second embodiment is described. Description of the structure same as the first embodiment is omitted.

Figure 13:
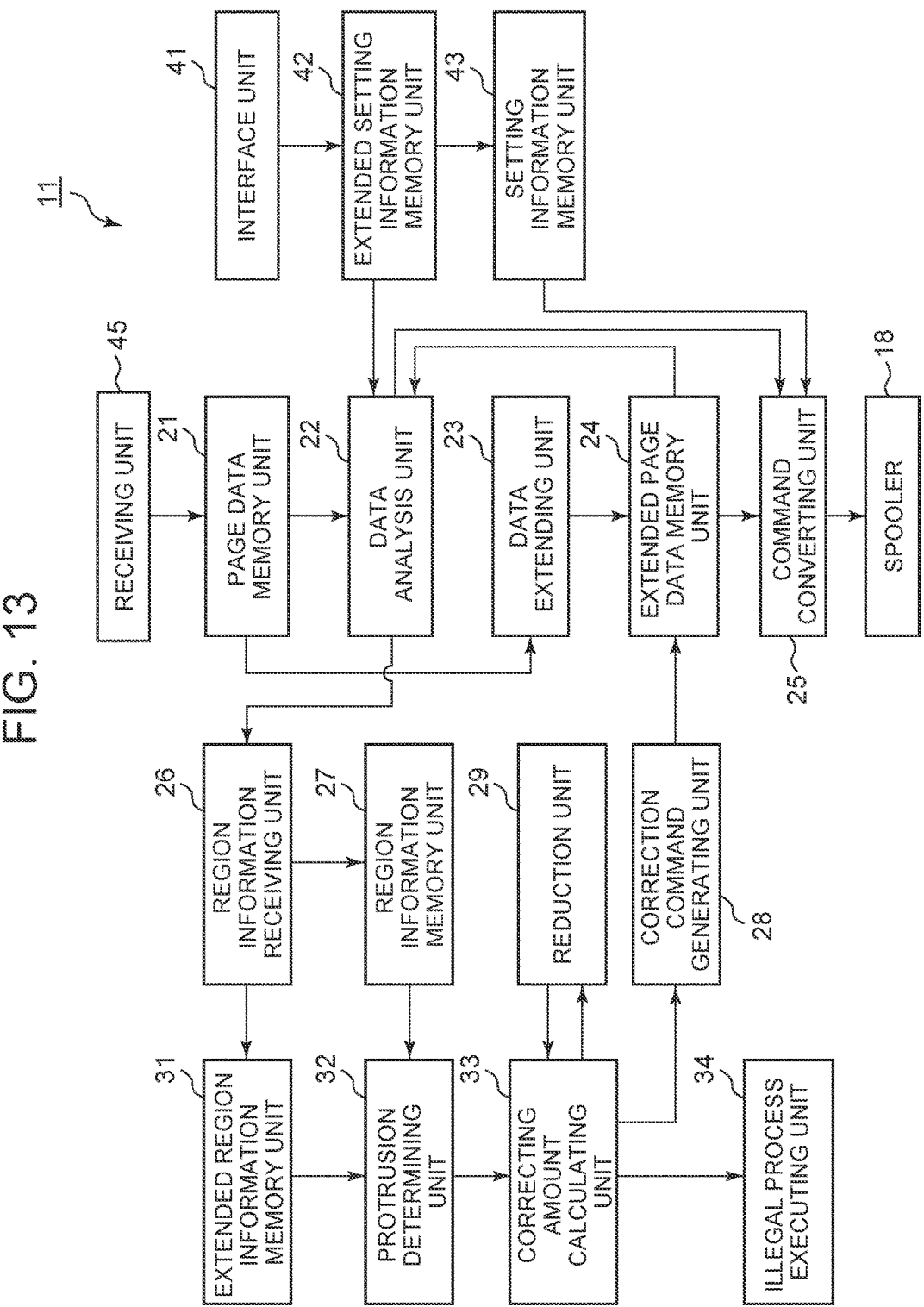
FIG. 13 is a block diagram showing a function configuration of the information processing apparatus according to the second embodiment.
Figure 14:
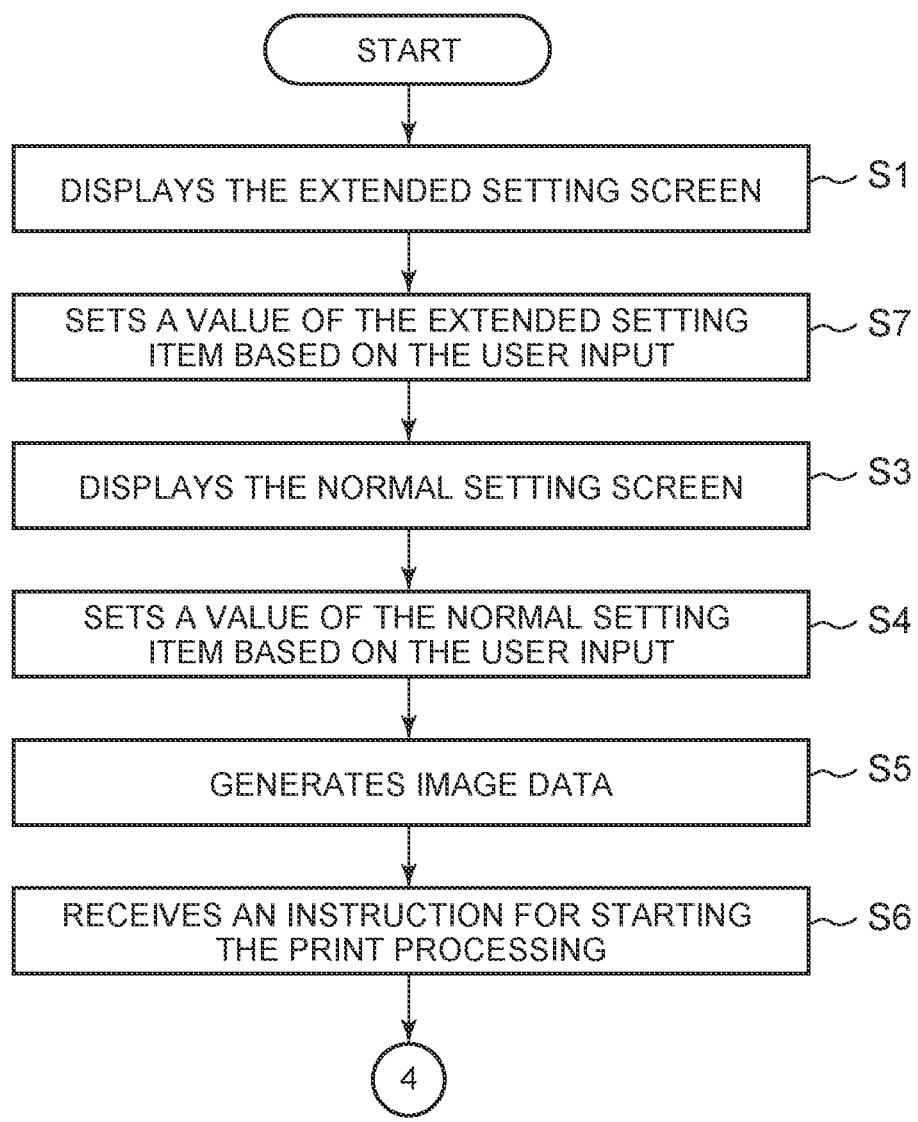
FIG. 14 is a flowchart showing processing executed by the information processing apparatus according to the second embodiment.

FIG. 13 is a block diagram showing a function configuration of the information processing apparatus 11.

As shown FIG. 13, the information processing apparatus 11 includes a reduction unit 29 in addition to the units described in the first embodiment. The reduction unit 29 is realized by the CPU and the printer driver program 16 written in the RAM.

The reduction unit 29 reduces the size of the character information block that protrudes from the sheet size. For example, the reduction unit 29 reduces the font size (the character size).

If at least one of the character information blocks protrudes from the sheet size, the protrusion determining unit 32 determines the state of the protrusion of the character information blocks.

Figure 19:
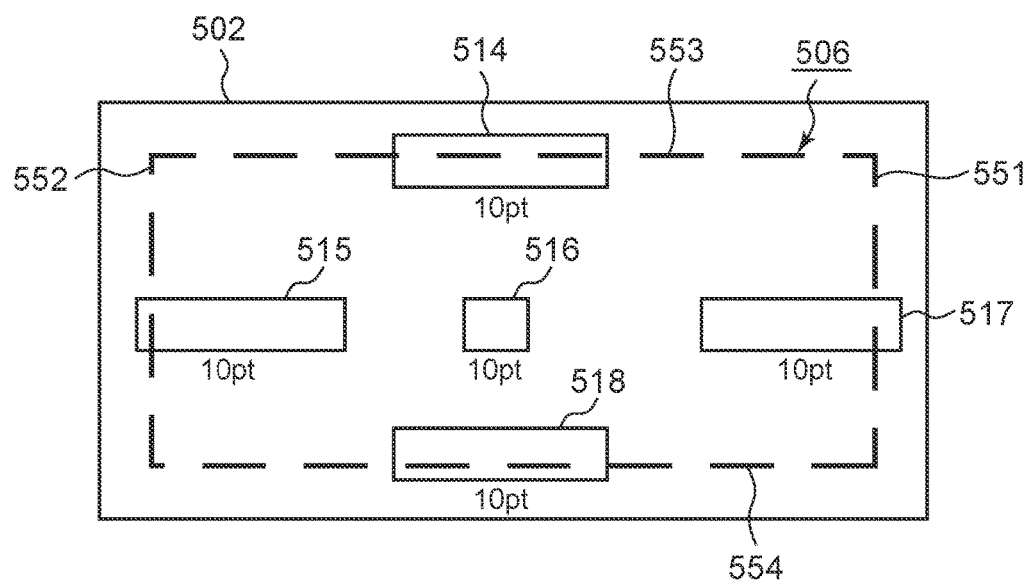
FIG. 19 is a schematic view showing a first extended page data set.

As shown in FIG. 10, FIG. 12, if the character information block protrudes from the border 551 and the border 553 not facing each other, the protrusion determining unit 32 determines the state of the protrusion is the first protrusion state. On the other hand, as shown in FIG. 19, if the character information block protrudes from the border 551 and border 552 facing each other, the protrusion determining unit 32 determines the state of the protrusion is the second protrusion state.

The protrusion determining unit 32 outputs information indicating the state of the protrusion to the correcting amount calculating unit 33.

The correcting amount calculating unit 33 determines which correction method the correcting amount calculating unit 33 can execute. A first correction method is a method to move the first extended page data set. Specifically, the first correction method is a method to move the all character information blocks included in the first executed page data set, in a specific direction by a constant distance. Namely, the first correction method is the method described in the first embodiment. A second correction method is a method to reduce the size of the character information block, namely, the character size. A third correction method is a method to move some of the character information blocks included in the first executed page data set.

If the state of the protrusion is the first protrusion state, the correcting amount calculating unit 33 determines whether the first correction method can be executed.

On the other hand, if the state of the protrusion is the second protrusion state, the correcting amount calculating unit 33 determines that the first correction method cannot be executed.

If the first correction method can be executed, the correcting amount calculating unit 33 outputs the correcting amount calculated by the first correction method, to the correction command generating unit 28.

If the first correction method cannot be executed, the correcting amount calculating unit 33 determines whether the protrusion can be eliminated by reducing the character information block protruding from the sheet size, namely, by the second correction method. If the second correction method can be executed, the reduction unit 29 reduces the font size of the character information block that protrudes from the sheet size. The reduction unit 29 outputs the font size of the reduced character information block as the correcting amount, to the correction command generating unit 28.

If the second correction method cannot be executed, the reduction unit 29 reduces the font size of the character information block that protrudes from the sheet size. Then the correcting amount calculating unit 33 calculates the protrusive amount of the reduced character information block. The correcting amount calculating unit 33 determines whether the protrusion is eliminated if the reduced character information block is moved, based on the protrusive amount. Namely, the correcting amount calculating unit 33 determines whether the third correction method can be executed. If the third correction method can be executed, the correcting amount calculating unit 33 calculates the movement amount of the reduced character information block based on the protrusive amount of the reduced character information block. The correcting amount calculating unit 33 outputs the calculated movement amount and the font size of the reduced character information block as the correcting amount, to the correction command generating unit 28.

The correction command generating unit 28 generates the correction command based on the correcting amount outputted from the correcting amount calculating unit 33 and the reduction unit 29. The correction command generating unit 28 incorporates the generated correction command into the first extended page data set in the extended page data memory unit 24.

2-2. Processing

Next, processing of the image forming system 1 is explained.

FIG. 14, FIG. 15, FIG. 16, and FIG. 17 are flowcharts chowing processing executed by the information processing apparatus 12.

Figure 18:
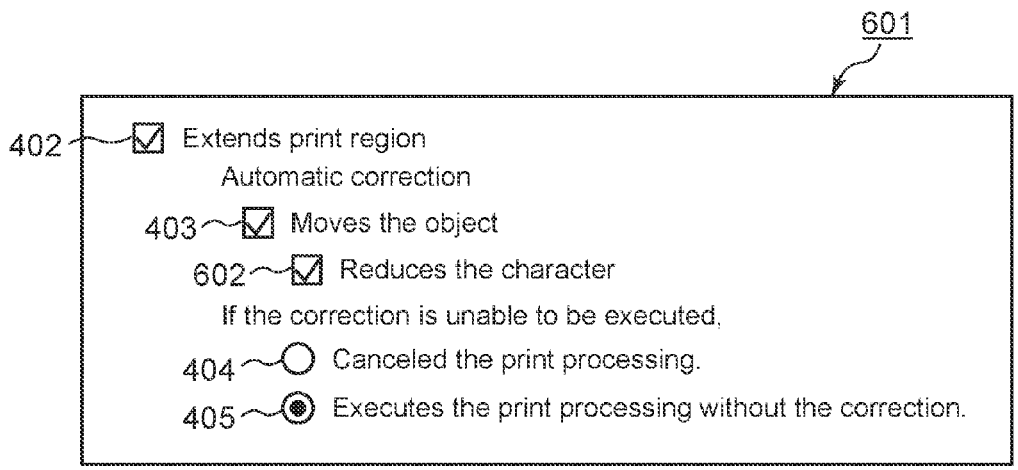
FIG. 18 is a schematic view showing an extended setting screen according to the second embodiment.

First, when the operation unit 5 receives the input signal based on the user input for displaying an extended setting screen 601 shown in FIG. 18, the interface unit 41 controls the display unit 4 to display the extended setting screen 601 (step S1).

Next, when the operation unit 5 receives the input signal based on the user input for setting the value of the extended setting item to the extended setting screen 601, the interface unit 41 sets the value of the extended setting item (step S7). Namely, the interface 41 writes the value of the extended setting item to the extended setting information memory unit 42.

As shown FIG. 18, the extended setting screen 601 may include a checkbox 402, a checkbox 403, a checkbox 602, a radio button 404, and a radio button 405.

The checkbox 602 is for selecting whether the second correction method is executed if the first correction method cannot be executed. If the user desires that the second correction method is executed if the first correction method cannot be executed, the user switches on the checkbox 602.

The processing of step S3-step S6 are same to the processing of the first embodiment. Therefore the description is omitted.

Figure 15:
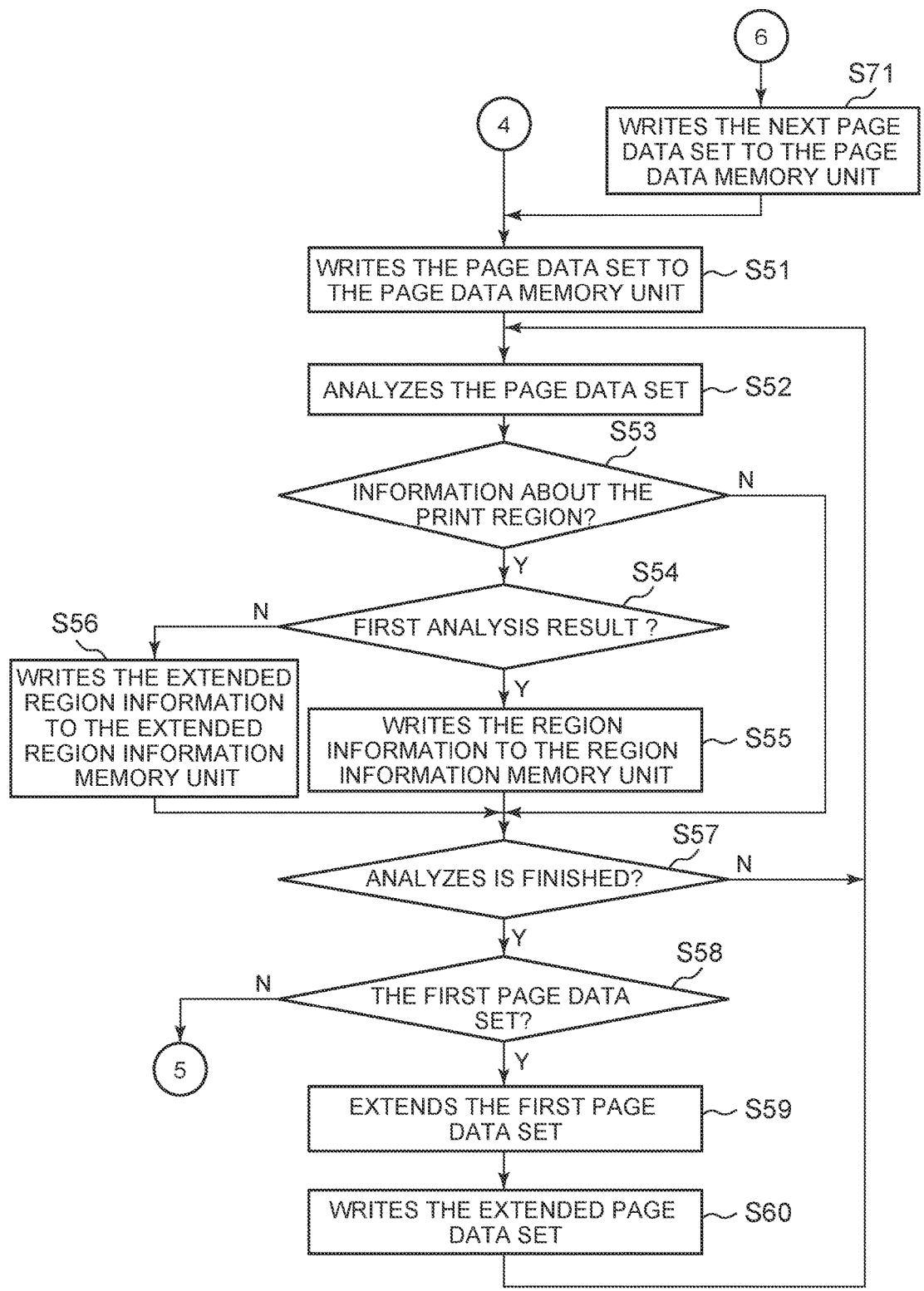
FIG. 15 is a flowchart showing processing executed by the information processing apparatus according to the second embodiment.

The processing of step S51-step S60, step S71 in FIG. 15 are same to the processing of the first embodiment. Therefore the description is omitted.

Figure 16:
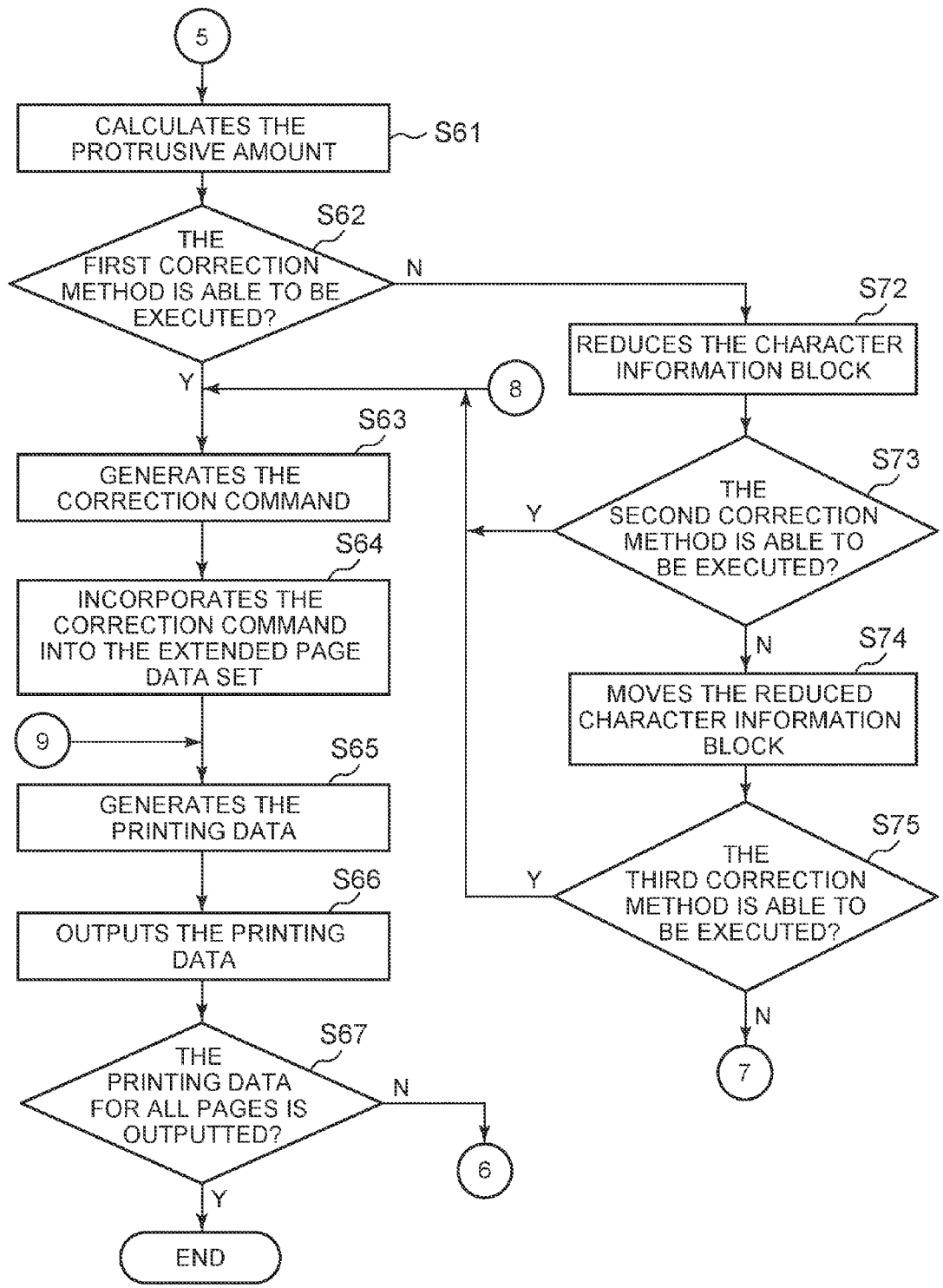
FIG. 16 is a flowchart showing processing executed by the information processing apparatus according to the second embodiment.

As shown FIG. 16, if the protrusion determining unit 32 determines at least the part of the character information block is arranged outside the sheet size, the correcting account calculating unit 33 calculates the protrusive amount of the character information block (step S61). Then the correcting amount calculating unit 33 determines whether the first correction method can be executed, based on the protrusive amount and position information (a block start position and a block range) of the character information block (step S62). If the correcting amount calculating unit 33 determines that the first correction method can be executed (step S62: YES), the correcting amount calculating unit 33 calculates movement amount for moving the all character information blocks included in the first executed page data set, in a specific direction by a constant distance so that the protrusion is eliminated, based on the protrusive account. The correcting amount calculating unit 33 outputs the calculated movement amount as the correcting amount, to the correction command generating unit 28. The correction command generating unit 28 generates the correction command for correcting the first executed page data set 502 based on the correcting amount (step S63).

The processing of step S64-step S67 are same to the processing of the first embodiment. Therefore the description is omitted.

On the other hand, the correcting amount calculating unit 33 determines that the first correction method cannot be executed (step S62: NO), the correcting amount calculating unit 33 receives the value of the extended setting item from the extended setting information memory unit 42. The correcting amount calculating unit 33 determines whether the second correction method (reducing the character information block) is executed based on the value of the extended setting item. If it is set to reducing the character information block, the reducing unit 29 reduces the character information block (step S72).

As shown in FIG. 19, the first extended page data set 502 includes a seventh character information block 514, an eighth character information block 515, a ninth character information block 516, a tenth character information block 517, and a eleventh character information block 518. The seventh character information block 514 protrudes from the border 553. The eleventh character information block 518 protrudes from the border 554. The border 553 and the border 554 face each other. And the eighth character information block 515 protrudes from the border 552. The tenth character information block 517 protrudes from the border 551. The border 552 and the border 551 face each other. Therefore, the protrusion determining unit 32 determines that the state of the protrusion is the second protrusion state. The protrusion determining unit 32 outputs a determination result to the correcting amount calculating unit 33. The correcting amount calculating unit 33 determines that the first correction method cannot be executed based on the determination result.

Figure 20:
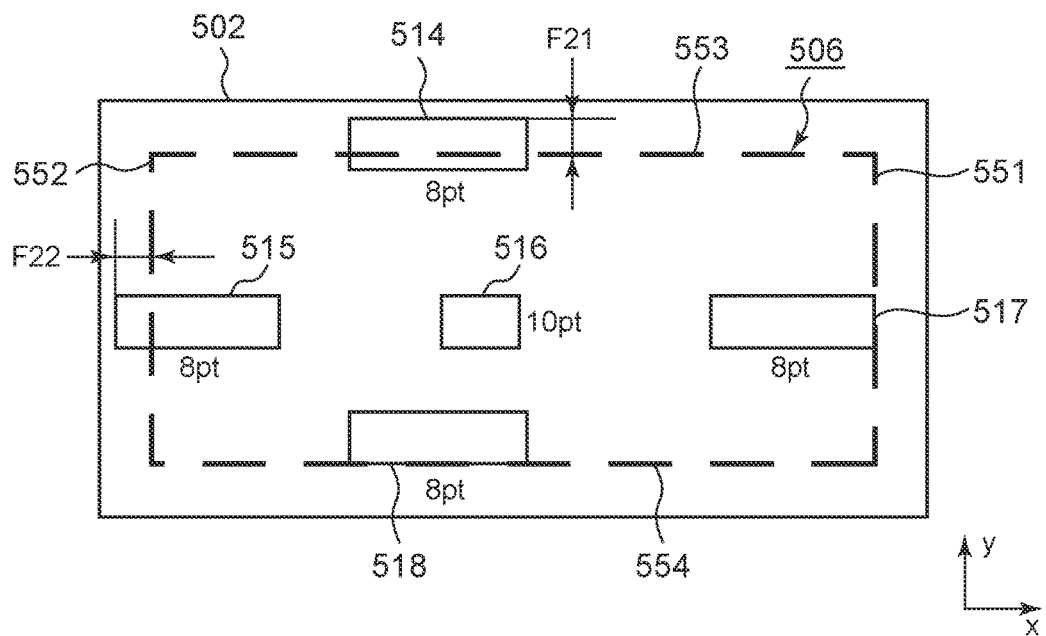
FIG. 20 is a schematic view showing a reduced first extended page data set.

As shown in FIG. 20, the reduction unit 29 reduces the font size of the seventh character information block 514, the eighth character information block 515, the tenth character information block 517, the eleventh character information block 518, protruding from the sheet size 506, from 10 point to 8 point.

The reduction unit 29 may reduce the font size of all of the character information blocks included in the first extended page data set 502.

Next, the correcting amount calculating unit 33 determines whether the second correction method can be executed for the first extended page data set 502 reduced by the reduction unit 29 (step S73).

Specifically, the correcting amount calculating unit 33 determines whether the character information block reduced by the reduction unit 29 protrudes from the sheet size 506, based on the sheet size 506, the printing start position of the character information block and the printing range of the character information block. If the character information block reduced by the reduction unit 29 protrudes from the sheet size 506, the correcting amount calculating unit 33 determines that the second correcting method cannot be executed (step S73: NO). If the character information block reduced by the reduction unit 29 does not protrude from the sheet size 506, the correcting amount calculating unit 33 determines that the second correcting method can be executed (step S73: YES).

If the second correcting method can be executed (step S73: YES), the correcting amount calculating unit 33 outputs the font size of the reduced character information block as the correcting amount, to the correction command generating unit 28. Then the process moves to step S63.

On the other hand, if the second correcting method cannot be executed (step S73: NO), the correcting amount calculating unit 33 moves the character information block reduced by the reduction unit 29 (step S74).

As shown FIG. 20, the protrusion is eliminated by reducing the tenth character information block 517 and the eleventh character information block 518. On the other hand, the protrusion is not eliminated in spite of reducing the seventh character information block 514 and the eighth character information block 515. Therefore, the correcting amount calculating unit 33 determines that the second correcting method cannot be executed.

Then, the correcting amount calculating unit 33 calculates the protrusive amounts for the seventh character information block 514 and the eighth character information block 515 based on the sheet size 506, the printing start position of the seventh character information block 514, the printing start position of the eighth character information block 515, the printing range of the seventh character information block 514 and the printing range of the eighth character information block 515. The correcting amount calculating unit 33 moves the seventh character information block 514 and the eighth character information block 515 based on the protrusive amounts.

The correcting amount calculating unit 33 moves the seventh character information block 514 in the printing range of the seventh character information block 514 before it is reduced. The correcting amount calculating unit 33 moves the eighth character information block 515 in the printing range of the eighth character information block 515 before it is reduced. Therefore, it can be prevented that the seventh character information block 514 overlaps with the eighth character information block 515.

As shown in FIG. 20, as for the seventh character information block 514, a protrusive amount F21 protrudes from the border 553 in the positive direction of the Y-axis. As for the eighth information block 515, a protrusive amount F22 protrudes from the border 552 in the negative direction of the X-axis.

The correcting amount calculating unit 33 calculates movement amount of the seventh character information block 514 and the eighth character information block 515 based on the sheet size 506, the printing start position of the seventh character information block 514, the printing start position of the eighth character information block 515, the printing range of the seventh character information block 514, the printing range of the eighth character information block 515.

The correcting amount calculating unit 33 determines whether the third correcting method can be executed based on the first extending page data set 502 where the seventh character information block 514 and the eighth character information block 515 are moved (step S75). Specifically, the correcting amount calculating unit 33 determines whether the moved seventh character information block 514 and the moved eighth character information block 515 protrude from the sheet size 506. If these character information blocks do not protrude from the sheet size 506, the correcting amount calculating unit 33 determines that the third correcting method can be executed (step S75: YES).

If the third correcting method can be executed (step S75: YES), the correcting amount calculating unit 33 outputs the font size and the movement amount of the reduced character information block (the seventh character information block 514, the eighth character information block 515, the tenth character information block 517 and the eleventh character information block 518) as the correcting amount, to the correction command generating unit 28. Then the process moves to step S63.

Figure 21:
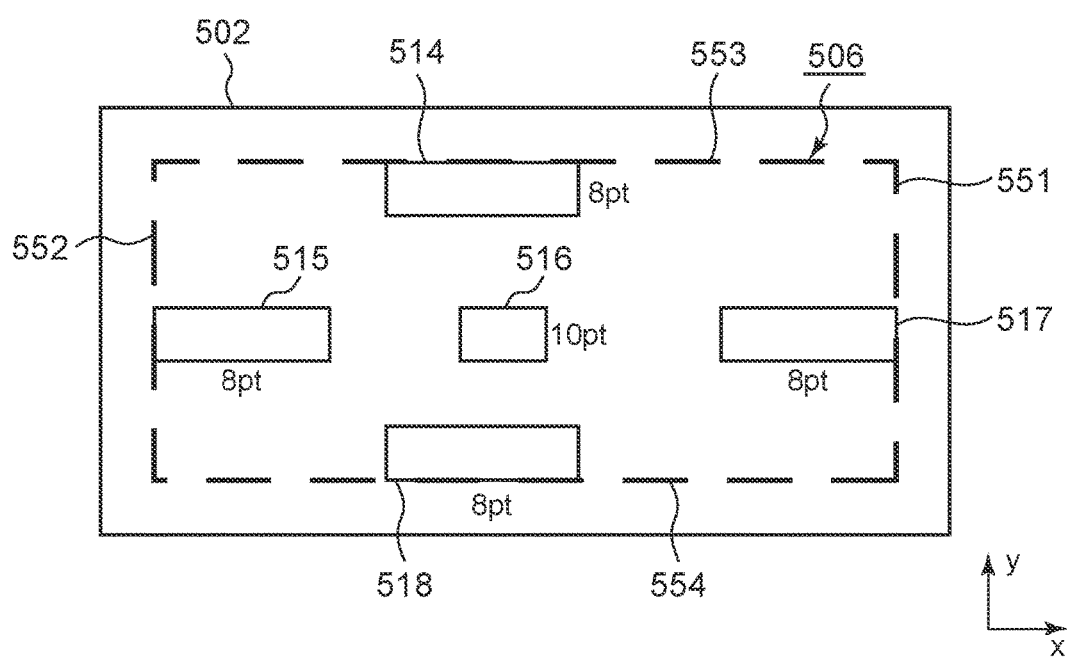
FIG. 21 is a schematic view showing a first extended page data set that is reduced and is moved.

As shown FIG. 21, the seventh character information block 514 moves by the movement amount E21 in the negative direction of the y-axis. The eighth character information block 515 moves by the movement amount E22 in the positive direction. As a result, the seventh character information block 514 and the eighth character information block 515 do not protrude from the sheet size 506. Therefore the correcting amount calculating unit 33 determines that the third correcting method can be executed (step S75: YES).

Next, the movement of the reduced character information block in the third correcting method is explained.

As shown in FIG. 22, the font size of the eighth character information block 515 is reduced from 10 point to 8 point. As a result, the eighth character information block 515 becomes the eighth character information block 515*a*. As for the eighth character information block 515*a*, a protrusive amount F22 is moved in the arrow direction. As a result, the eighth character information block 515*a* becomes the eighth character information block 515*b*. The eighth character information block 515*a* is moved in the printing range of the eighth character information block 515.

Figure 17:
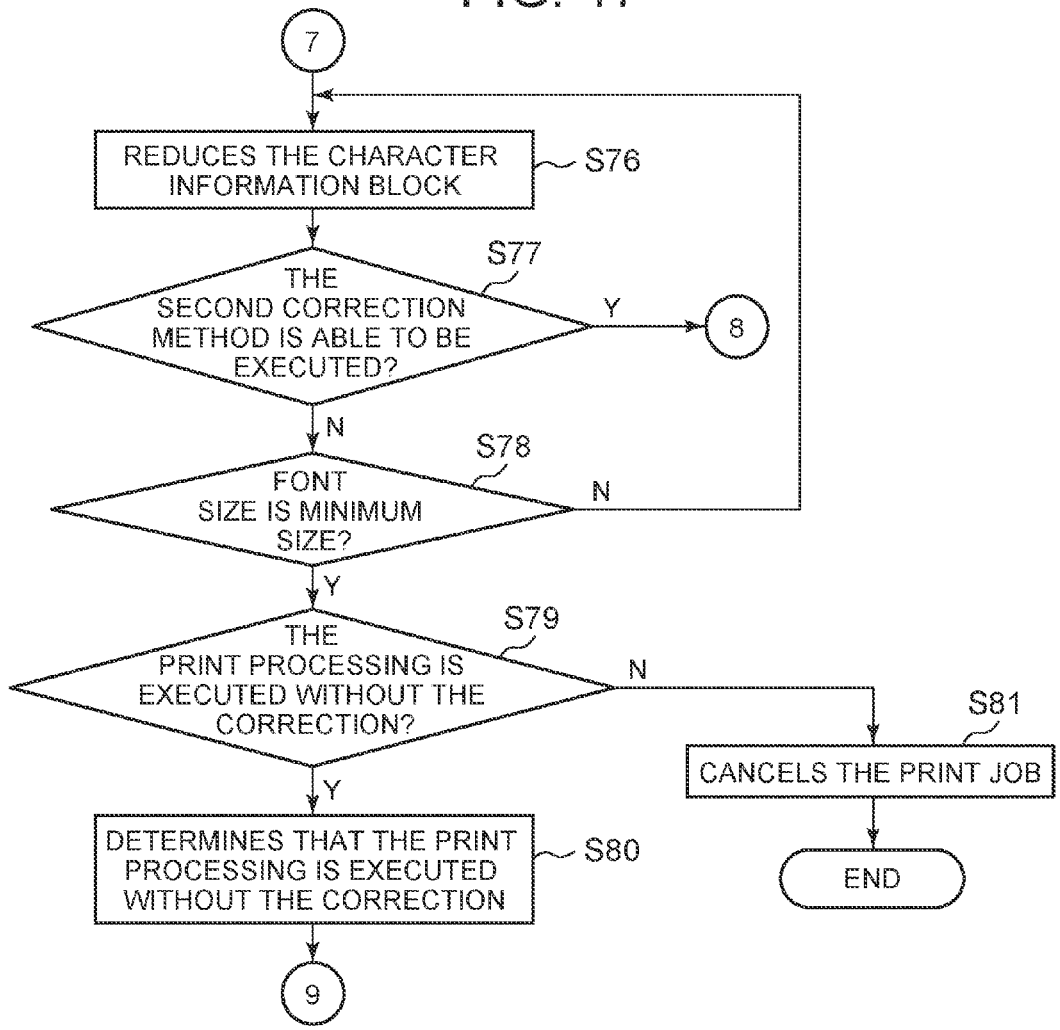
FIG. 17 is a flowchart showing processing executed by the information processing apparatus according to the second embodiment.

As shown in FIG. 17, the correcting amount calculating unit 33 determines that the third correcting method cannot be executed (step S75: NO), the correcting amount calculating unit 33 reduces the font size of the reduced seven character information block 514 and the reduced eighth character information block 515 more (step S76). For example, the correcting amount calculating unit 33 reduces the seven character information block 514 and the font size of the eighth character information block 515 from 8 point to 6 point.

Then the correcting amount calculating unit 33 determines whether the second correcting method can be executed (step S77). If the second correcting method can be executed (step S77: YES), the correcting amount calculating unit 33 outputs the font size and the movement amount of the reduced character information block (the seventh character information block 514, the eighth character information block 515, the tenth character information block 517 and the eleventh character information block 518) as the correcting amount, to the correction command generating unit 28. Then the process moves to step S63.

The correcting amount calculating unit 33 continues reducing the seventh character information block 514 and the eighth character information block 515 until the second correction method can be executed (step S78: NO, step S76, step S77: NO).

If the font size becomes minimum size as a result of continuing reducing (step S78: YES), the process moves step S79. The processing of step S79-step S81 are same to the processing of the first embodiment. Therefore the description is omitted.

The second embodiment further prevents the image being formed outside a desired print region.

In each embodiment, the image forming system 1 is applicable to label printing to form image on labels stuck with a sheet at predetermined intervals. In this case, the size of the print region is a label size that is smaller than the sheet size. The image forming apparatus 12 may be a copying apparatus, a facsimile machine, and a multifunction machine.

The present invention is not limited to the foregoing embodiment but many modifications and variations are possible within the spirit and scope of the appended claims of the invention.

What is claimed is:

1. An information processing apparatus comprising:
   a receiving unit that receives image data;
   a first memory unit that stores the image data;
   an extending unit that extends the image data;
   a second memory unit that stores the image data which is extended by the extending unit as extended image data, wherein the extended image data includes a plurality of objects;

a determining unit that determines whether at least one object of the plurality of objects is arranged outside a print region of the image data; and a correcting unit that corrects the extended image data by moving the plurality of objects by a constant distance in a specific direction, whereby the at least one object is repositioned, if the determining unit determines that the at least one object is arranged outside the print region of the image data.

2. The information processing apparatus according to claim 1, wherein the correcting unit repositions the plurality of objects such that the plurality of objects are arranged in the print region of the image data.

3. The information processing apparatus according to claim 1, wherein the correcting unit outputs a cancellation signal of image forming processing for the plurality of objects if the at least one object cannot be arranged within the print region by the correction.

4. The information processing apparatus according to claim 1, wherein the correcting unit outputs an executing signal of image forming processing without the correction if the at least one object cannot be arranged in the print region by the correction.

5. The information processing apparatus according to claim 1, wherein the print region size is the same as a label size, wherein the label size is smaller than a paper size.

6. The information processing apparatus according to claim 1, wherein, if at least a part of the at least one object is arranged outside the print region, the determining unit determines that the at least one object is arranged outside the print region.

7. An information processing apparatus comprising:
a receiving unit that receives image data;
a first memory unit that stores the image data;
an extending unit that extends the image data;
a second memory unit that stores the image data which is extended by the extending unit as extended image data,
wherein the extended image data includes a first object and a second object;
a determining unit that determines whether the first object is arranged outside a print region of the image data, and determines whether the second object is arranged outside a print region of the image data; and
a correcting unit that corrects the extended image data by repositioning the first object if the determining unit determines that the first object is arranged outside the print region of the image data, and corrects the extended image data by repositioning the second object if the determining unit determines that the second object is arranged outside the print region of the image data.

8. An information processing apparatus comprising:
a receiving unit that receives image data;
a first memory unit that stores the image data;
an extending unit that extends the image data;
a second memory unit that stores the image data which is extended by the extending unit as extended image data,
wherein the extended image data includes a first object and a second object;
a determining unit that determines whether the first object is arranged outside a print region of the image data, and determines whether the second object is arranged outside a print region of the image data; and
a correcting unit that corrects the extended image data by changing an attribute of the first object if the determining unit determines that the first object is arranged outside the print region of the image data, and corrects the extended image data by changing an attribute of the second object if the determining unit determines that the second object is arranged outside the print region of the image data.

9. The information processing apparatus according to claim 8, wherein the attribute of the first object is a position of the first object and the attribute of the second object is a position of the second object.

10. The information processing apparatus according to claim 8, wherein the attribute of the first object is a size of the first object and the attribute of the second object is a size of the second object.

11. The information processing apparatus according to claim 10, wherein:
at least one of the first object or the second object is a character information block; and
the correcting unit corrects the extended image data by changing a size of the character information block.

12. The information processing apparatus according to claim 10, wherein:
the determining unit determines whether at least one of the first object or the second object whose size is changed by the correcting unit remains arranged outside the print region of the image data; and
the correcting unit repositions the at least one of the first object or the second object if the determining unit determines that the at least one of the first object or the second object remains arranged outside the print region of the image data.

13. The information processing apparatus according to claim 12, wherein the correcting unit repositions the at least one of the first object or the second object within a region of the at least one of the first object or the second object before the size of the object is changed.

* * * * *